FIG. 2.
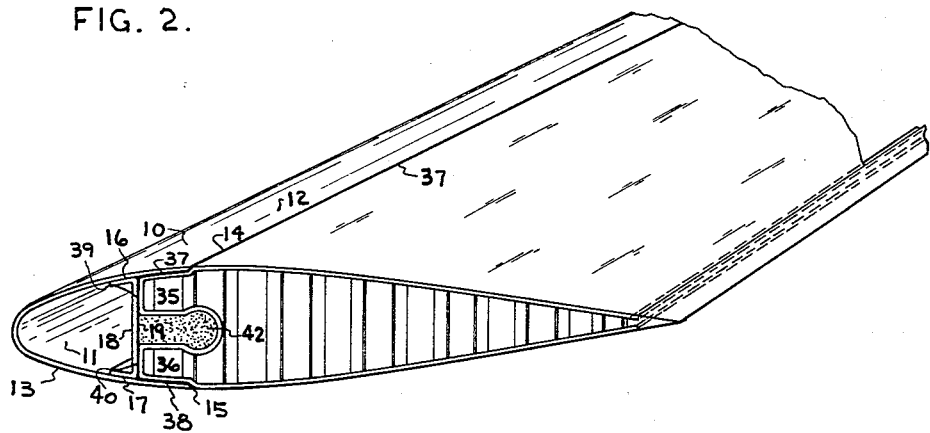
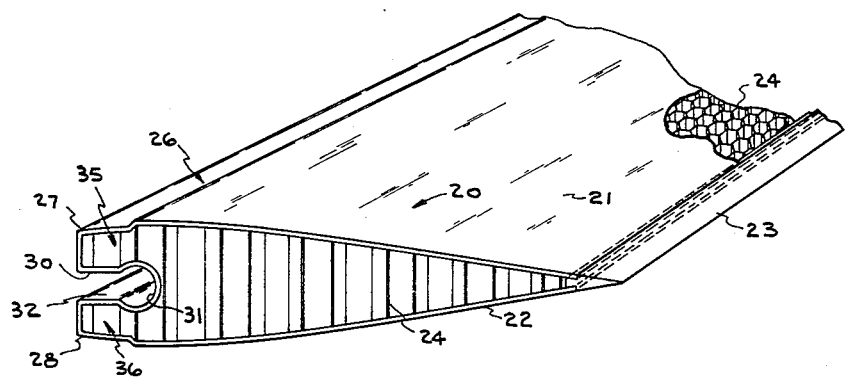
FIG. 1.
INVENTORS
FRANK L. STULEN AND ALB C. BALLAUER
BY
ATTORNEY 3,123,144
COMPOSITE CONSTRUCTION FOR HELICOPTER
ROTOR BLADES AND THE LIKE
Frank L. Stulen, Traverse City, and Alb C. Ballauer, Menominee, Mich., assignors to Parsons Corporation, Detroit, Mich., a corporation of Michigan
Filed Aug. 29, 1962, Ser. No. 220,190
5 Claims. (Cl. 170—159)

This invention relates to composite construction of airfoils such as helicopter rotor blades and specifically to the type of composite construction including a forward metal spar having plate-like aft-extending edges, and an aft structure having relatively light-weight filler material between thin upper and lower structural skins. The term "composite construction" is used in the engineering sense as referring to bending members utilizing more than one type of structural material.

Filler for the aft structure of helicopter rotor blades may be of such light-weight materials as plastic foams or cellular honeycomb. While such types of filler material are of relatively low density, they possess ample rigidity in shear to carry air loads from the aft structure forward to the spar. As covering for such a filled aft structure, relatively thin structural skins, such as aluminum or fiberglas cloth may be used. In structural theory the skins are considered to transmit to the spar the tension and compression components of the bending forces of the air loads.

Certain problems in the manufacture of such composite rotor blades are reviewed below. Initially, it is difficult to achieve sufficiently close manufacturing tolerances to fit the parts for bonding. Next, the local pressures applied for the purpose of setting adhesive bonds may crush the filler material. In flight, the loads on metal spar margins may cause them to deflect with each cycle of rotation, and such deflections may gradually peel away the adhesive bonds.

The present invention is intended to overcome these problems. In general, a full span throat-like opening is provided in the forward part of the filler material, midway between the spar margins, dividing the forward part of the aft structure into parallel-extending upper and lower portions of much greater deflectability. A structural skin lines the throat, so that these upper and lower portions serve as full span deflectable beams. Their deflectance when pressed outwardly against the spar margins permits the adhesive bonds to the spar margins to be set by positive pressure. They deflect also with the cyclic deflections of the spar margins, and thus lessen the tendency to peel the adhesive joints.

In the accompanying drawings:

FIGURE 1 is a fragmentary perspective view of the aft structure for a rotor blade embodying the present invention.

FIGURE 2 is a similar view showing the assembly of such aft structure to a rotor blade spar of the type described.

In describing the present invention in detail, the more familiar elements will be first referred to.

The spar of FIGURE 2, generally designated 10, is as shown in U.S. Patent No. 3,002,567. It includes a curved leading edge plate 11 which serves as the leading edge of the airfoil, and includes upper and lower curved plate margin portions 12 and 13 whose outer surfaces coincide with the airfoil envelope or mold line. The plate portions 12 and 13 terminate in aft-extending edges 14 and 15 in the region of maximum thickness of the airfoil. Brazed within the curved leading edge plate 11 are upper and lower flanges 16 and 17 of a steel channel whose web is denominated the spar web 18. The flanges 16 and 17 extend forwardly from the spar web 18, so that its aft side 19 demarks the forward ends of the aft extending spar margins 12 and 13.

The aft structure shown in FIGURE 2 and generally designated 20, consists of upper and lower outer skins 21 and 22 which may be of any of the fairly high strength structural sheet materials, such as aluminum, stainless steel, or resin impregnated fiberglass cloth, the cloth being chosen for the present embodiment. The outer surfaces of the skins 21, 22 conform to the airfoil mold line aft of the aft-extending spar edges 14 and 15. They extend rearward to a full spanwise trailing edge member, an arrowhead shaped extrusion 23 made of plastic material and bonded to the skins 21 and 22. The filler material which supports the skins 21, 22, transfers the shear component of air loads forward to the spar 10. A desirable material for this purpose is in honeycomb form, with its cells aligned to extend from the upper skin 21 to the lower skin 22, as the filler material 24 shown. The material from which such honeycomb filler 24 will be manufactured is selected for consistency of material properties with, and ease of attachment to, the skins 21 and 22. With the fiberglass skins 21 and 22, plastic impregnated material may advantageously be used for the filler 24. Alternatively, prefoamed plastic may be employed. The filler 24 is carved to the airfoil contour before being bonded within the skins 21 and 22.

Novelty lies in the design and construction of that part of the aft structure 20 referred to as the forward part generally designated 26, which extends between the spar plate margins 12, 13; and in its assembly to the spar 10. Such forward part 26 is joggled inward from the airfoil mold line an amount equal to the thickness of spar plate margins 12 and 13. Attachment of the aft structure 20 to the spar 10 is made by bonding to the inner surfaces of the plate margins 12 and 13 and to the aft surface 19 of the spar web 18. The skin portions to which such attachment is made are referred to as the upper and lower forward portions 27, 28; these may be integral with the upper and lower skins 21, 22.

Formed into the forward end of the filler material 24 and extending the full spanwise length of the aft structure, is a throat-like opening 30. As shown in FIGURE 2, the throat-like opening 30 may be in the form of a horizontal keyway, located at approximately mid-height of the filler material 24 and having an enlarged rounded aft end 31. The entire throat-like opening 30 is lined with a skin 32, which may be integral with the forward skin portions 27, 28.

The chordwise length of the throat-like opening 30 is preferably somewhat greater than that of the aft extending margins 14 and 15. The opening 30 thus divides the forward part of the aft structure 20 into upper and lower deflectable beam-like portions generally designated 35 and 36. The depth of the opening 30 is sufficient to accommodate expansible means to exert pressure by which these deflectable portions 35 and 36 may be deflected outward. By such outward deflection, positive bonding pressure may be exerted against the inner surfaces of the upper and lower spar margins 14 and 15.

In FIGURE 2, the heavy lines 37, 38, 39 and 40 indicate the upper and lower adhesive bonds by which the aft structure 20 is attached to the spar 10. Such bonds include the horizontally-extending upper and lower bonds 37 and 38 to the outward-presented surfaces of the deflectable portions 35 and 36, and the vertical upper and lower bonds 39 and 40 to their forward-presented surfaces.

The pressure to form the horizontal bonds 37 and 38 may be developed in various ways. For example, mechanical means may be inserted into the opening 30. A convenient and novel method which makes mechanical means unnecessary, consists in filling the throat-like opening with a liquid foaming plastic material which expands on curing, and thus exerts outward pressure.

The throat-like opening 30 and the portion of the spar web 18 at its forward side together constitute a spanwise tubular chamber. The aft structure is assembled in place against the forward structure, with the mating portions coated with bonding material of which the bonds 37, 38, 39 and 40 will be formed; and one spanwise end of such tubular chamber is closed off. In the other end such "foamed in place" plastic material may be poured, forming a key-shaped expansible fill 42 which extends the length of the entire rotor blade. As it expands on curing, pressure is exerted upwardly against the upper deflectable portion 35 and downwardly against the lower deflectable portion 36. By such pressure, the bonds 37 and 38 are set.

The deflectability of the upper and lower deflectable portions 35 and 36 is utilized not merely in the bonding operation but also in flight. Bending and twisting combine with the centrifugal loads on the spar to cause the spar margins 12 and 13 to flex slightly during every revolution of the rotor. The continued effect of this flexing might be to peel the bonds 37 and 38, if the filler material in the aft structure did not permit equal flexure. The deflectability of the portions 35, 36 permits a corresponding flexure, minimizing such tendency to peel.

As a practical matter, such peeling tendency is initially minimized by the deflectance of the upper and lower portions 35 and 36 at the time of manufacture, which assures that the bonds 37, 38 when originally formed will be sound and secure.

The invention is applicable not only to rotor blades, but to other structures, and most obviously to other airfoils. Variations in details of structure and in methods of attachment will occur to those familiar with the problems of the art. Accordingly, the present invention is not to be construed narrowly, but instead as fully co-extensive with the claims hereof.

We claim:

1. A composite construction for airfoils and the like comprising
   a spar including upper and lower plate portions at the airfoil mold line and there having aft-extending margins,
   aft structure including outer swins and filler material between and supporting said skins,
   said filled material being characterized by shear rigidity and
   said filler material having a forward part contained between the upper and lower margins of the spar plate portions,
   together with an adhesive bond between the spar margins and the aft structure, characterized in that
   the filler material has a throat-like opening in its forward part midway between the spar plate margins,
   said throat-like opening extending full spanwise length of said aft structure and dividing the forward part thereof into upper and lower deflectable portions
   whereby pressure exerted within said throat-like opening toward the upper and lower spar margins deflects said upper and lower deflectable portions to apply pressure between them and the spar margins for setting the adhesive bond.

2. Composite construction for airfoils and the like as defined in claim 1,
   the throat-like opening being lined with a skin.

3. Composite construction as defined in claim 2,
   the throat-like opening being of sufficient depth to accommodate expansible means to exert such pressure.

4. Composite construction as defined in claim 3,
   the spar including a web whose aft side demarks the forward ends of the aft-extending spar margins,
   the upper and lower deflectable portions of the aft structure having forward skins and an adhesive bond adhering them to the aft side of the spar web.

5. Composite construction as defined in claim 4,
   the throat-like opening and the spar web portion at the forward side of said opening together constituting a spanwise tubular chamber,
   together further with a plastic material filling said chamber,
   the plastic material being of the foamed-in-place type which expands on curing,
   by the expansion of which such pressure is exerted within said throat to deflect such deflatable portions and thereby set the adhesive bond.

References Cited in the file of this patent
UNITED STATES PATENTS

| | | |
|---|---|---|
| 2,653,139 | Sterling | Sept. 22, 1953 |
| 2,884,078 | Stamm | Apr. 28, 1959 |
| 3,002,567 | Stulen | Oct. 3, 1961 |